Figure 15:
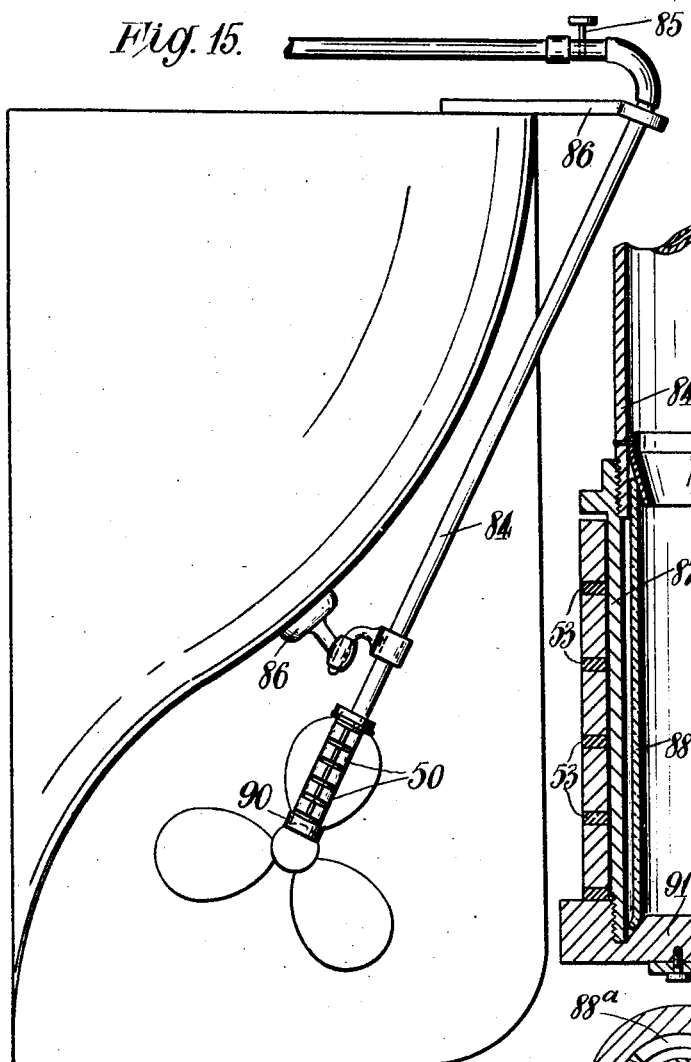

Sept. 18, 1928.
M. G. HOLBEACH
1,685,025
APPARATUS FOR INDICATING THE DIRECTION OR ANGLE OF STREAM LINES IN FLUIDS PARTICULARLY APPLICABLE FOR USE IN DESIGNING COUNTERPROPELLER DEVICES
Filed Jan. 12, 1926 4 Sheets-Sheet 1
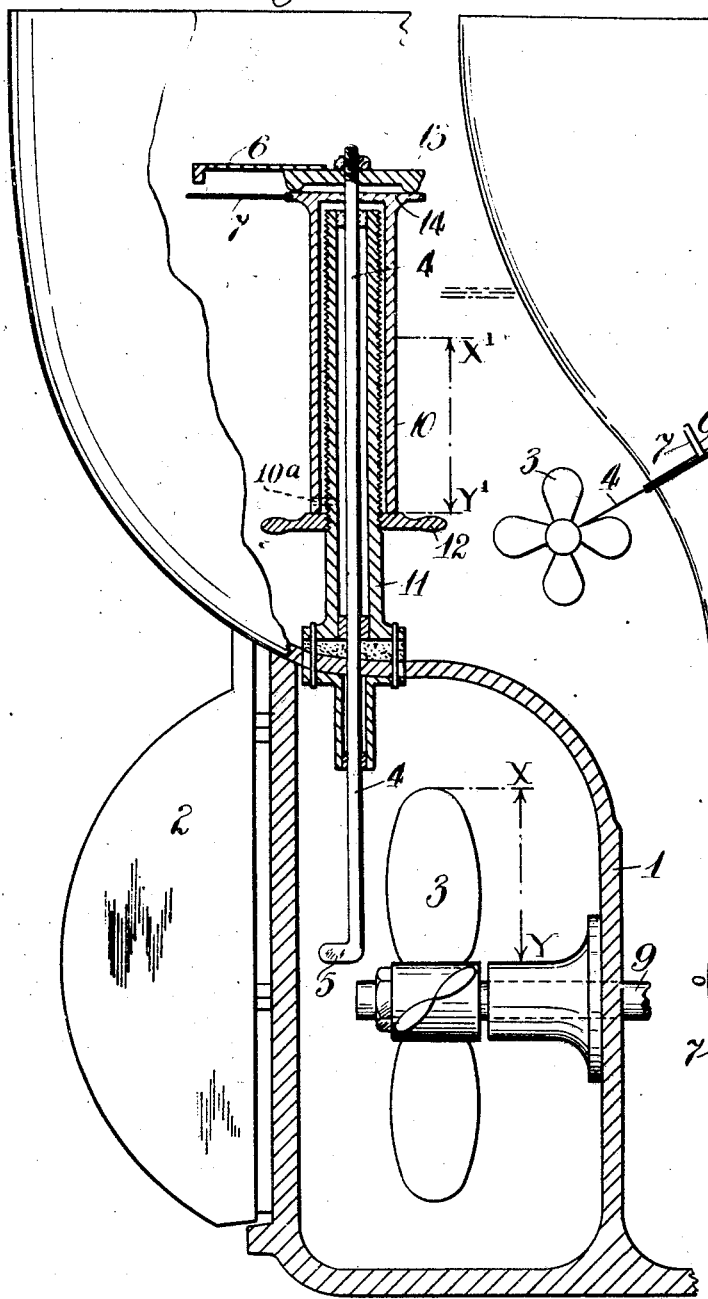
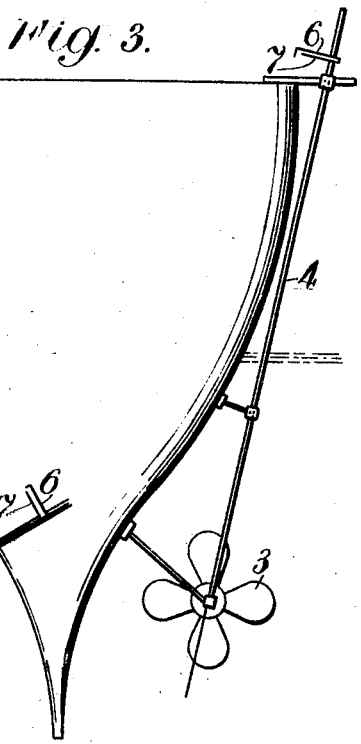
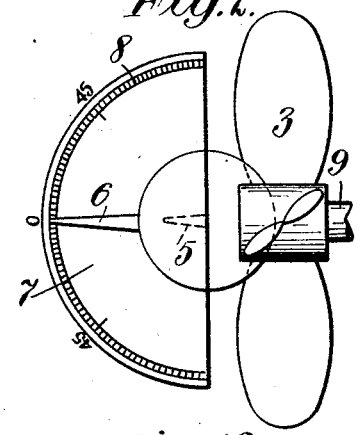
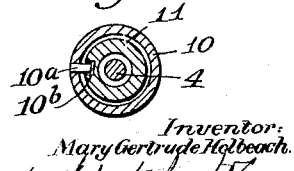
Inventor:
Mary Gertrude Holbeach.
per
Attorneys.

Sept. 18, 1928. 1,685,025
M. G. HOLBEACH
APPARATUS FOR INDICATING THE DIRECTION OR ANGLE OF STREAM LINES IN
FLUIDS PARTICULARLY APPLICABLE FOR USE IN DESIGNING
COUNTERPROPELLER DEVICES
Filed Jan. 12, 1926  4 Sheets-Sheet 2
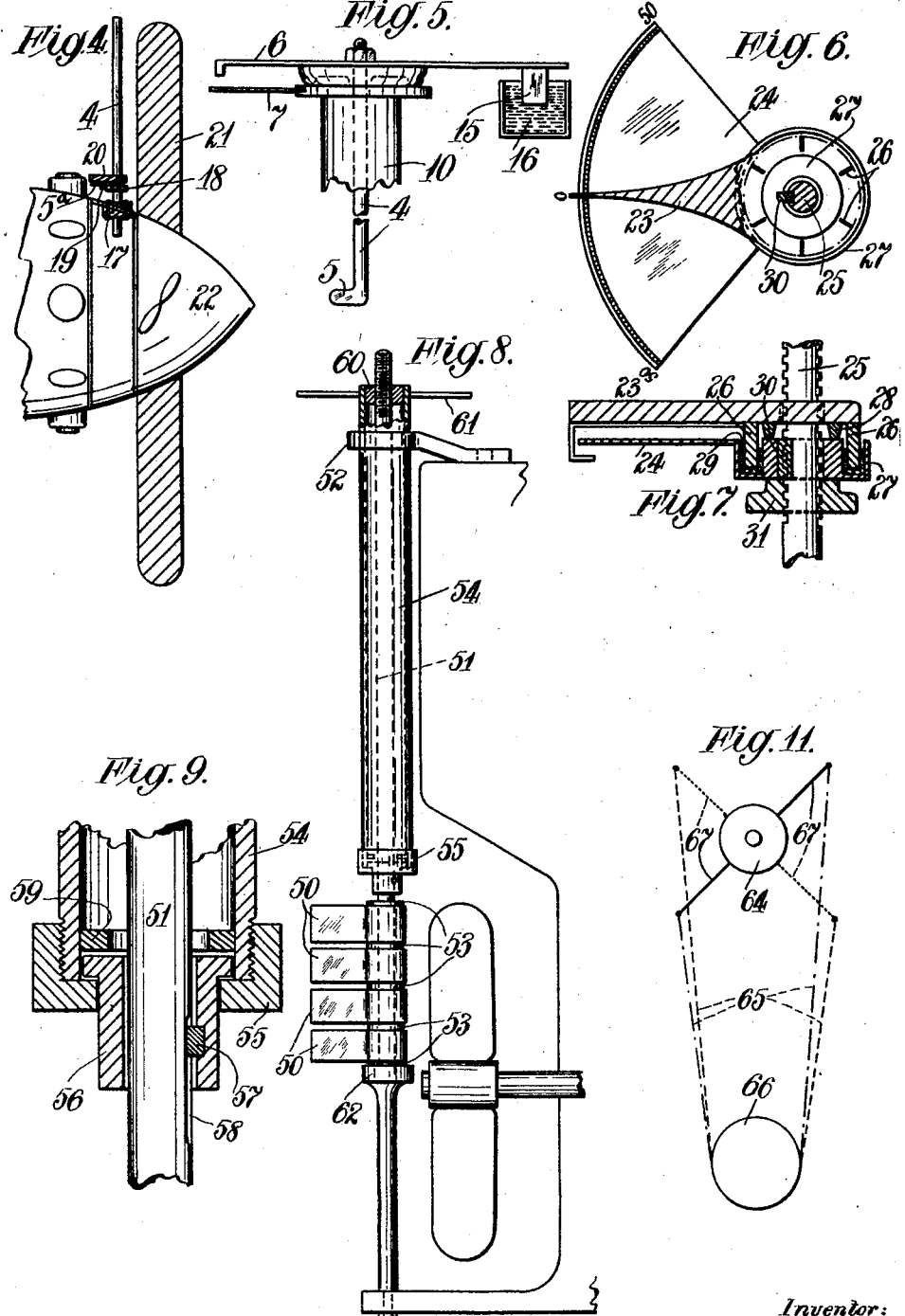
Inventor:
Mary Gertrude Holbeach
per Fetherstonhaugh & Co
Attorneys.

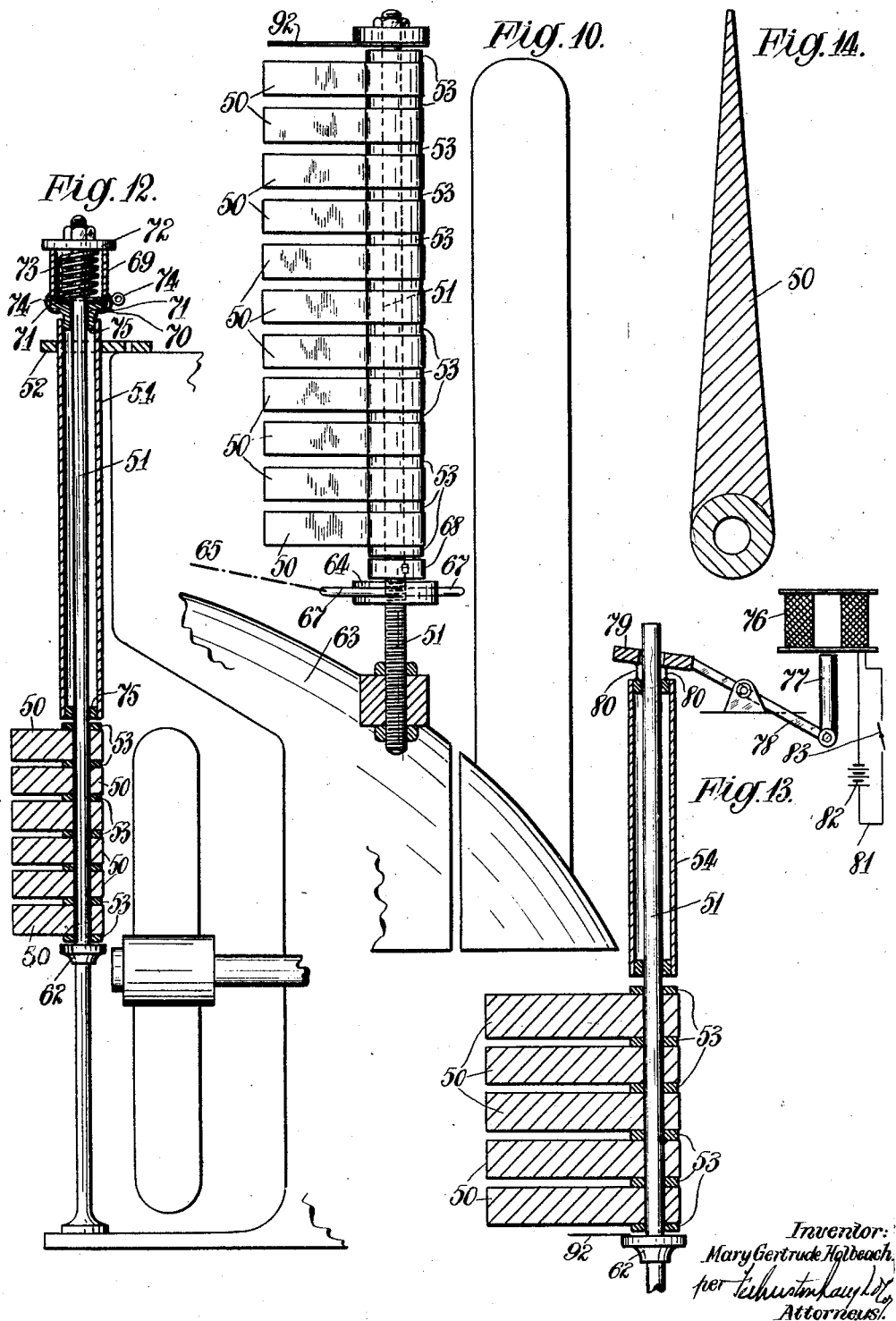

Sept. 18, 1928.  
M. G. HOLBEACH  
1,685,025

APPARATUS FOR INDICATING THE DIRECTION OR ANGLE OF STREAM LINES IN
FLUIDS PARTICULARLY APPLICABLE FOR USE IN DESIGNING
COUNTERPROPELLER DEVICES

Filed Jan. 12, 1926  4 Sheets-Sheet 4

Inventor:
Mary Gertrude Holbeach
Attorneys.

Patented Sept. 18, 1928.

1,685,025

UNITED STATES PATENT OFFICE.

MARY GERTRUDE HOLBEACH, OF PORTSMOUTH, ENGLAND.

APPARATUS FOR INDICATING THE DIRECTION OR ANGLE OF STREAM LINES IN FLUIDS PARTICULARLY APPLICABLE FOR USE IN DESIGNING COUNTERPROPELLER DEVICES.

Application filed January 12, 1926. Serial No. 80,830, and in Great Britain January 29, 1925.

This invention relates to improvements in or relating to apparatus for indicating the direction or angle of stream lines of a fluid discharge for determining the angles of the blades of a counter propeller for marine or aerial vessels.

Dealing with counter propeller practice of the present day, determination of the angles of the blades of counter propellers is very difficult, and the best relationship between the counter propeller and the usual screw propeller can only be approximately calculated beforehand. It has hitherto been the practice to assume certain angles for the counter propeller blades, and then to carry out trials of an individual vessel until some form and arrangement of the counter propeller blades is decided on, and adopted for use. It is found in practice that after repeated trials the blade angles may still be incorrect, that is to say, they do not conform to the natural angles of the outflow from the ordinary screw propeller.

An object of the present invention is to provide an indicating apparatus by which it becomes possible to indicate the natural angles of outflow from the root of the blade to the tip thereof, at any given number of revolutions of the propeller, so that by tabulating the step by step indication readings taken during a voyage, there is provided reliable data from which the blades of a counter propeller may be made giving the best practical working relationship between a main propeller and a counter propeller.

Indicating apparatus according to the present invention may take divers forms, the arrangements hereinafter described in detail being given as examples only. The essential parts of the apparatus in whatever form it may be made up consists of a movable member at the outflow station, said member being responsive to the outflow of the fluid at that station, this member acting as an indicator in itself or actuating either directly or indirectly an indicator, which indicator may take various forms.

The apparatus may be arranged so that the indicator readings may be taken either internally or externally for a vessel.

In designing the counter propeller blades from the tabulated results obtained with an apparatus according to the present invention it may be preferable to set the blades at the proper angles for a speed corresponding to the normal number of revolutions of the engine at full load or speed. The blades may however be modified in construction to accommodate them to some peculiar working condition, for example, for a vessel where a high efficiency is required at various speeds.

For air-craft work the correct angles of discharge from the propeller or tractor screw can be readily observed with apparatus according to the present invention.

The accompanying drawings show various forms of indicating apparatus, as applied to marine work and as applied to air-craft work.

Fig. 1 is a side view and Fig. 2 a plan view of one form, while Fig. 3 is a diagrammatic view of the apparatus, the left hand side of the view showing the apparatus arranged for reading internally of the vessel, and the right hand side thereof showing the apparatus arranged for reading externally of the vessel. Fig. 4 is a diagrammatic view of a form of apparatus adapted for air craft work. Fig. 5 is a detail view of a damping device. Figs. 6 and 7 are views of a varient form of apparatus for air-craft work having a simple form of damper.

Figure 16:
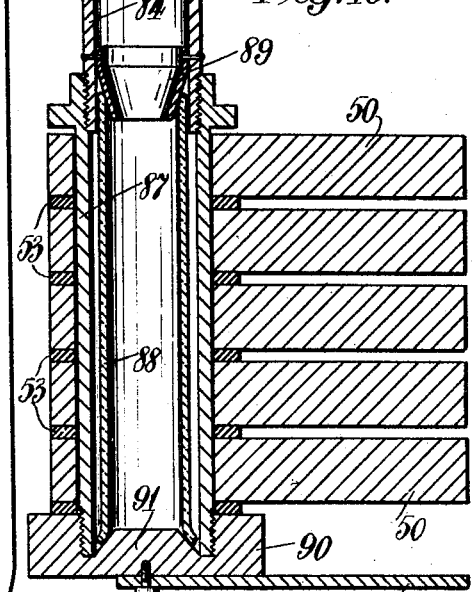
Figure 17:
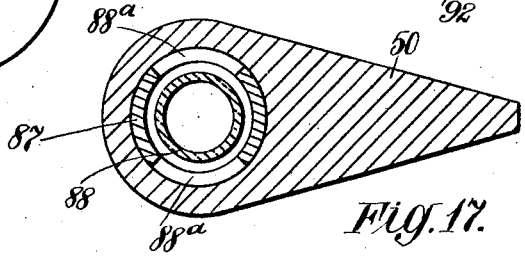

Figs. 8 to 17 show various arrangements using a plurality of vanes, so that on completion of a trial the multiple vanes as a unit will indicate the correct angles of discharge over a certain distance, say, from the root to the tip of a propeller blade. Fig. 8 shows a mechanical arrangement, Fig. 9 a detail thereof, Fig. 10 another mechanical arrangement as applied to aeroplane work, Fig. 11 a view of a control therefor, Fig. 12 is a spring arrangement, Fig. 13 is an electromagnet arrangement, Fig. 14 a view of one of the vanes, while Figs. 15, 16 and 17 show a fluid pressure arrangement worked by compressed air, Fig. 18 is a detail hereinafter referred to.

Referring to Figs. 1 and 2, the stern frame of the vessel is indicated by 1, the rudder by 2 and the screw propeller by 3. The indicating apparatus comprises a rod or spindle 4 forming a mount and having a small rudder or vane 5 at its bottom end. This vane 5 may be integral with the rod or spindle 4 or may be attached thereto. The vane and rod are arranged to swing freely behind the screw propeller 3. At the top end of the spindle 4 is fixed a pointer 6. The pointer 6, as shown, may be in alignment with the vane 5, though it may be positioned at an angle thereto, say at right angles. Under the pointer 6 is a dial 7. This dial is suitably marked, in the example shown it is marked in angular degrees as shown at 8, and the reading is an edge-reading. The zero-position of the dial 7 is parallel to or in line with the propeller shaft axis, this shaft being designated 9. The disposition of the zero position may however vary and will be in accordance with the setting of the pointer 6.

The pointer 6 is moved up and down relatively to the blades of the propeller 3 so that step by step indications can be made extending from the root of the blade to the tip thereof. Thus whatever angle the vane 5 makes at these various stations or positions between the root and the tip, this angle is indicated by the pointer 6 working over the dial 7. The angular setting of the vane 5 at each respective station will correspond to the angle of outflow from the screw propeller thereat.

The distance X—Y (Fig. 1) corresponds to the length of the propeller blade from the root to the tip, and the rod 4 and the vane 5 are capable of a corresponding movement. The vane 5 in Fig. 1 is shown at a station corresponding to the root of the blade of the screw propeller. The spindle 4 and vane 5 are moved by turning a handle (screw jack wheel) 12 working on an externally screwed tube 11, which handle raises or lowers a sleeve 10. In order to prevent the sleeve 10 from rotating, a pin 10$^a$ attached thereto works in a slot 10$^b$ cut in the tube 11 (see Fig. 18). It will be seen from the drawings that the sleeve 10 is mounted on the jack 12. The sleeve 10 carries the dial 7 and a head plate 13 of the spindle 4 bears on a face plate 14 of the sleeve 10. The pointer 6 is carried by the head plate 13. The distance X'—Y' (Fig. 1) corresponds to the distance X—Y hereinbefore referred to.

A simple form of damper comprises a small vane or paddle 15 attached to the pointer 6, the vane 15 working in an oil or mercury bath 16. This is shown in Fig. 5. The damping device may be mechanical, or magnetic.

Fig. 4 shows a form of indicator according to the present invention as applied to air-craft work. The spindle or mount 4 in this form is rigidly fixed in a bearing 17 and the vane 20 freely swings on the spindle 4 and is set in any position from root to tip by moving the ring 18 up or down the spindle 4.

The end of the vane 20 acts as the pointer (indicator) and the dial 5$^a$ is attached to the ring 18.

The set screw 19 in ring 18 should work in a groove in the rod 4 so that the zero of the dial shall always be parallel with the screw shaft.

The parts 5$^a$, 20 and 18 may be moved up and down the spindle 4 on release of the set screw 19. The spindle 4 may be suitably marked to indicate the various distances from the root and tip of the propeller or other blade 21 of the air craft body 22.

Fig. 3 shows the apparatus applied to a twin-screw vessel, the left hand side showing the apparatus arranged for reading from the inside of the vessel, and the right hand side showing an arrangement for reading from the deck of the vessel.

Referring to Figs. 6 and 7 these views show a variant form of flow indicator according to the present invention.

In this form there is a combined vane and pointer 23 working over a dial 24, the part 23 being mounted on a spindle or mount 25. Damper vanes 26 extend into a damper box 27 forming a step bearing to which the dial 24 is attached. 29 indicates the damping liquid in the damper box and 28 is a circular slide. 30 is a key fitted to the damper box, which key slides in a groove (not shown) in the spindle 25. 31 is a screw-jack wheel for imparting movement to the aforesaid parts up and down the spindle or mount 25.

By turning the jack-wheel 31 the apparatus is moved up and down the spindle 25. The zero line is always parallel with the screw shaft. The vane 23 swings freely. As shown the spindle 25 has a square thread.

The vane pointer enables a reading to be taken from above; at the side, and from below.

Figs. 8 to 17 show other ways of carrying out the present invention. In these arrangements there is provided a plurality of freely swinging or movable members ranged so as to include various points along the outflow station as for example, ranged, so as to follow a propeller blade from the root to the tip thereof, so that each member is responsive to the outflow of the fluid at a particular point of the station, and when the members swing or move to the correct natural angles of outflow means are provided whereby they are fixed or held against further movement, so that on completion of a trial the multiple vanes as a unit will indicate the correct angles of discharge over a certain distance, say, from the root to the tip of the propeller blade, which angles may be charted to provide data from which the blades of a counter propeller may be made, or the apparatus itself may be used in a manner comparable to a template or model.

The means provided for fixing or holding the vanes when these are located at the natural angles of outflow may be of a mechanical, electrical, or pneumatic or fluid pressure nature.

Referring to Figs. 8 and 9 a number of vanes 50 are ranged on a rod, tube or other suitable holder or mount 51. The vanes 50 are arranged to swing freely on this rod or other holder. This rod or holder 51 is suitably held at the outflow station, as for example, behind an ordinary screw propeller. A holding-down or clamping device 52 may be used for this purpose.

Spacing elements, as for example, collars 53 may be interposed between each vane and its neighbours. Sleeves may be interposed between the vane boss and the rod or other holder. When the screw propeller is revolved each of the vanes will move to correspond to the natural angle of outflow at that point in the outflow station at which each vane is positioned.

As an example of a mechanical device for clamping the vanes, a screw jack type of device is shown by Figs. 8 and 9.

On the rod 51 is slidably mounted a tube or sleeve 54 having a cap 55 screwed onto its lower end. Carried by the cap 55 is a thimble 56 having a key 57 working in a key-way 58 provided in the rod 51. The tube 54 has a ring or collar 59 adapted to engage the thimble 56.

The top of the fixed rod 51 is screw-threaded and engages a member 60, comparable to a nut, secured to the tube 54. Actuating arms 61 are connected to the tube 54.

When the vanes have moved to the natural angles of outflow, these are clamped in those positions by moving down the sliding tube 54 so that the thimble 56 bears on the top vane of the set of vanes 50, or the top collar of the set of collars 53, the vanes being clamped and held from movement between the thimble 56 and a fixed collar or foot bearing 62 on the rod 51.

Figs. 10 and 11 show the improvements or modifications as applied to aeroplane work. In this construction the rod 51 is attached to the aeroplane body 63 adjacent the ordinary screw propeller. The head 64 of the screw-jack device is actuated by a rope or wire coupling 65 moved by a control wheel 66. The ends of the coupling 65 are attached to arms 67 fixed to the head 64. In Fig. 11 the dotted outline indicates the unlocked position and the full outline the locked position of the screw-jack clamping device. 68 is a crown-piece moved by the head 64, this crown-piece being loosely keyed to the rod 51.

Fig. 12 illustrates a spring clamping-device. At the head of the rod 51 is a casing 69. A crown-piece 70 is carried by the sleeve 54. This part 70 is attached to the casing 69 by a coupling 71. Interposed between this piece 70 and a collar 72 on the rod 51 is a spring 73. The spring 73 is held charged by a release pin or trigger 74 passing through the rod 51. The sleeve 54 has bearings 75 to guide it in its movement. On release of the spring the coupling 71 is broken or severed and the sleeve 54 is forced down and all the vanes are clamped against movement.

An electrical device may comprise clutch or braking devices which may be operative either on the closing or the opening of a circuit. One way of doing this is shown in Fig. 13 which comprises an electro-magnetic device. An electro-magnet 76 has its core or plunger 77 attached to one end of a lever connection 78, the other end of which forms a press or wiper 79 acting on the sleeve 54 to move this downwards and clamp the vanes. 80 are suspension threads which pull up the sleeve 54 to normal position on release of the press or wiper 79. The circuit is indicated by 81, the battery by 82, and the switch by 83.

Fig. 14 shows a stream lined vane 50.

Figs. 15, 16 and 17 illustrate by way of example, a fluid pressure arrangement in the form of a pneumatic device, Fig. 15 showing the device in use with a twin-screw vessel. 84 designates a compressed air supply pipe or tube, 85 an air valve therein, 86 attachment devices. One end of the pipe or tube 84 is attached, as by a screw union to a holder 87, which is slotted as at 88$^a$ (Fig. 17). On this holder 87 the vanes 50 are mounted. Within the holder 87 is a collapsible tube 88. An air-tight joint is made between one end of this tube 88 and the pipe 84 as by a cone or nozzle 89. The other end of the collapsible tube 88 is kept air tight by a cap 90 screwing on the holder 87 and having an internal cone 91.

When (for example) compressed air is admitted to the tube 88 the wall thereof is extended and the tube is turned into a rigid or non-yielding member, and parts thereof project into the slots 88$^a$ and grip the vanes and hold these against movement.

The fluid pressure may be applied in various ways as by the admission of compressed air, or by pumping.

There may be embodied with any of the arrangements above described a datum pointer 92, as shown in Figs. 10, 13 and 16.

Various modifications and changes in constructions may be made without departing from the spirit and scope of the present invention.

What I claim is:—

1. Apparatus for indicating the natural angle of flow of stream lines at different points of a fluid discharge for determining the angles of the blades of a counter propeller for marine or aerial vessels, comprising a support, a vane capable of angular displacement on said support, a rod on said support to which said vane is fixed, a dial plate, a pointer carried by said rod co-operating with said dial plate, and means for sliding the rod to various points of the fluid discharge.

2. Apparatus for indicating the natural angle of flow of stream lines at different points of a fliud discharge for determining the angles of the blades of a counter propeller for marine or aerial vessels, comprising a support, a vane capable of angular displacement on said support, a rod on said support to which said vane is fixed, a dial plate, a pointer carried by said rod co-operating with said dial plate, and means consisting of a screw feed for sliding the rod to various points of the fluid discharge.

3. Apparatus for determining the angles of the blades of a counter propeller for marine or aerial vessels, comprising a support, a vane capable of angular displacement on said support, a rod on said support on which said vane is carried, and means for reading the indication given by said vane.

In testimony whereof, I affix my signature.

MARY GERTRUDE HOLBEACH.